3,174,133
ACTUATION OF ON-OFF OUTPUTS FROM ELECTRONIC DIGITAL COMPUTER DEVICE
Irvin A. Kunzman, Jr., Norristown, and Wallace B. Jakacki, Chalfont, Pa., assignors to Leeds and Northrup Company, Philadelphia, Pa., a corporation of Pennsylvania
Filed May 12, 1961, Ser. No. 109,736
9 Claims. (Cl. 340—147)

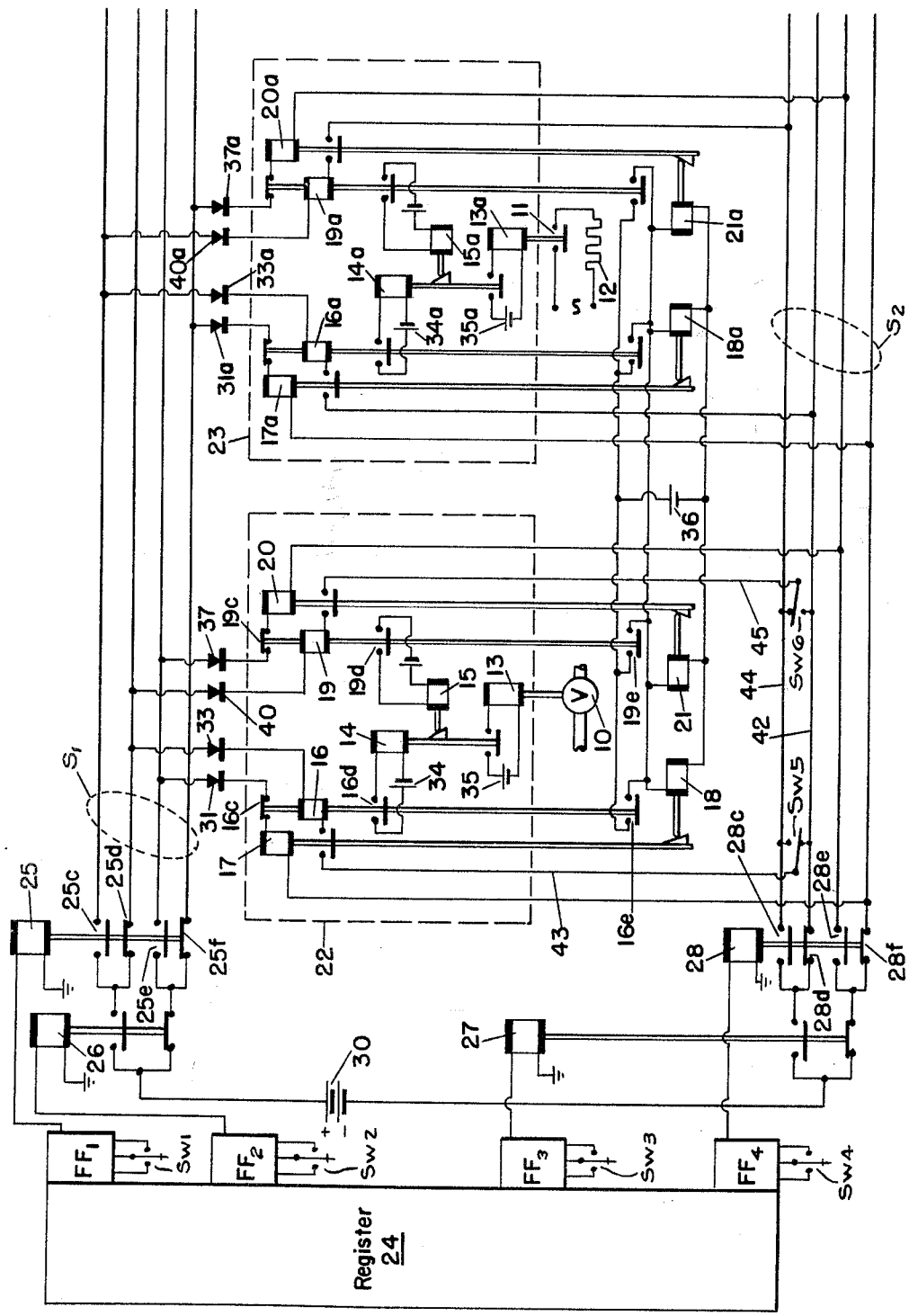

This invention relates to control systems, more particularly of the type utilized in combination with computers operated in accordance with measured variables, and has for an object the provision of a control system which provides safeguards against practically all the possibilities of malfunctioning of the computer in directing the operation of the control system.

As well understood by those skilled in the art, it is necessary that computers include self-checking features in order to prevent error in the operations required of them. While these self-checking features have proven satisfactory for computer operations, they leave much to be desired in that they are not self-checking in respect to control systems which may be associated with their outputs. The problem arises from the fact that the components of a computer of the digital type comprise elements which are in either of two states, as for example, on or off. Thus, every such component or element will always be in one or the other of its states, and thus every component or element will either be in the correct or the incorrect state at a given instant of time. Thus in reference to the components producing the output from the computer, it becomes necessary to carry forward a system check which will assure the required operation of the control system responding to the computer output and which will guard against a malfunction which could be catastrophic in its end result, particularly if the control system were utilized in conjunction with nuclear reactors or steam boiler systems.

The malfunction of a computer output in directing the operation of a control system is particularly critical where the final control elements are of the two-position type and a single plural digit output from the computer may select the final control element to be operated and the position that this element should occupy. Under these conditions an error in the computer output may result in the improper selection of the final control and/or an improper position signal being provided for that final control element.

It is an object of the present invention to utilize a control system in which the circuit elements involved in the selection and operation of a final control element must assume given states during a first phase of operation and the opposite state during the second phase of an operation. If any of the circuit elements or components fail to change their state as indicated, the control system will be made ineffective to operate any of the final control elements.

In carrying out the present invention in one form thereof, there is produced for each address signal in digital form a complemental signal, the address signal being for the purpose of identifying and selecting a final control element to be controlled to maintain the magnitude of a condition at a desired value. The address and complemental signals together with the command signals are applied to a decoder which then applies to relay means its plurality of outputs. Thus, the address signal energizes selected relays for partially completing an energizing circuit for an operating coil of a final control element, while the complement of the address signal is utilized to complete the energizing circuit for the operating coil of the final control element. In this manner, if there be a disparity between any part of the address signal and its complement, the energizing circuit is not completed and for the reason that the disparity has been caused by a malfunction which the present system guards against and distinguishes from a normal control signal.

Appearing in the output of the computer with the address signal there will also be a command signal to indicate which position is desired for the selected final control element. When the output from the computer is the complement of the address signal the command signal may be repeated or the complement of the command signal may be used.

For further objects and advantages of the invention and for an example of a particular embodiment thereof, reference is to be had to the following description taken in conjunction with the accompanying drawing illustrating schematically a system embodying the invention.

Referring to the drawing, the invention in one form has been shown as applied to the control of the operation of two final control elements 10 and 11, the first comprising a two-position solenoid valve, and the second a contactor or relay which controls the energization of a heating coil 12. Inasmuch as the relay systems 22 and 23 for the two final control elements 10 and 11 are identical, the relays of relay system 23 for the contactor 11 will be given the same reference characters as for the relay system 22 associated with the solenoid operated valve 10, with the addition of the subscript $a$. The energization of the operating coil 13 of the solenoid valve 10 is controlled by a relay 14 of the "set" or latched-in type. It has a tripping coil 15. The energization of the coil of relay 14 is under the control of a relay 16, the energization of which is dependent upon the operation of another relay 17 of the set or latched-in type. The tripping coil 15 of relay 14 is energized under the control of a relay 19, the energization of which depends upon the operation of a relay 20, also of the set or latched-in type. The relays 17 and 20 have tripping coils 18 and 21 respectively.

The relay system 22 just described lies within a broken-line rectangle, a like broken-line rectangle enclosing the second relay system 23. It is understood that many more relay systems may be utilized in conjunction with like or similar final control elements and that the operation of each final control element will be selected by an address signal from a computer together with a command signal and as may be stored from time to time in a register 24. The register 24 is a well known component of computers and preferably is a shift register of the parallel readout type. Such registers include a plurality of memory or storage devices. The register provides output signals which are applied to bistable devices or flip-flop circuits $FF_1$–$FF_4$ to turn them on and off depending upon the nature of the binary digits stored in corresponding positions in the register. For example, with an output from the register to the flip-flop circuit $FF_1$ corresponding with a "1" in the binary system, that flip-flop will be turned on, and there will be an output applied to its output conductor for energization of the operating coil of a relay 25. If the output signal corresponds with a "0" in the binary system, the flip-flop $FF_1$ will not be turned on, and the operating coil of relay 25 will not be energized. The foregoing example applies to the remaining flip-flops $FF_2$–$FF_4$ in that a signal in the register 24 corresponding with a "1" will turn on a flip-flop, and a "0" will not.

Whether or not signals will be "1's" or "0's" will depend upon the nature of the inputs to the register. Such inputs, for the illustrated system in accordance with the present invention, will be made up of 3-digit address signals and their complements, together with a digit representative of whether or not a final control element is to be actuated in one direction or the other. More specifically, the address signal for the control element 10 will be 1 0 0, and its complement 0 1 1. Similarly, the address for the final control element 11 will be 0 0 0, and the complement of that address will be 1 1 1. The direction of actuation of the final control element will depend upon the energization of flip-flop FF$_4$. When that flip-flop energizes the operating coil of a relay 28, the operating coils 13 and 13a of the final control elements 10 and 11 will be deenergized, i.e., a "1" digit represents a command signal for deenergization of the operating coils of the final control elements, and a "0" provides for energization of the operating coils of the final control elements.

As will later appear, the contacts of the relays 25–28 function as a decoding system to apply to the signal channels S$_1$ and S$_2$ coded output signals including the above-described address and control signals and their complements. While shown as including two signal channels S$_1$ and S$_2$, the decoding system may comprise a single relay "tree" with all of the relay contacts provided in a single signal channel. For example, in the drawing, relays 26 and 25 form one "tree" and relays 27 and 28 form a second "tree." For a single "tree" the first relays 26 and 25 will be as shown. The third relay will have eight contacts and the fourth sixteen contacts each expanded as to connections in manner illustrated for relays 26 and 25. The connections to the relay systems will then be from the appropriate conductors of the group of sixteen then making up channel S$_1$. There would be a single return line from each relay system to the negative side of battery 30. This modification has not been illustrated since obvious to one skilled in the art and for the further reasons that the system illustrated is preferred since involving a lesser number of control circuits.

By reason of the use of an address signal in digital form, together with the complement of that address signal, likewise in digital form, there is provided maximum assurance against possibility of erroneous actuation of a particular one of the final control elements. As an example, the system guards against the possibility that fuel to a boiler might be increased at the time steam consumption is to be reduced.

Assuming now that the final control element 10 is to be actuated for opening its valve to increase fuel to a boiler or refrigerant to a cooling system as exemplary of operations which may be performed by valves as final control elements, it will be understood that the address portion of the register 24 will first have stored therein the address signal 1 0 0 and thereafter will have stored its complement 0 1 1. For both the address and its complement, the directional controlling flip-flop circuit FF$_4$ will have applied thereto an input signal for an output corresponding with a binary "0." In this connection, it is to be noted that the flip-flop circuits FF$_1$–FF$_4$ may be manually set as by the provision of the manually set switches, Sw$_1$–Sw$_4$.

Assuming now that the register 24 has stored therein the binary number 1000 and applies to the flip-flop circuits input signals for producing at their respective output circuits signals corresponding with 1 0 0 0, the following takes place. Only the relay 25 is energized since the flip-flop circuit FF$_1$ is the only bistable device having an output for energizing a relay. Accordingly, an energizing circuit for the operating coil of relay 17 may be traced from a source of supply shown as a battery 30, by way of the normally closed contacts of relay 26, contacts 25e of relay 25, diode 31, normally closed contacts 16c of relay 16, the operating coil of relay 17, normally closed contacts 28f of relay 28, and by way of the normally closed contacts of relay 27 to the other side of the battery 30. The relay 17 is actuated from its unlatched to its set or latched position to close its contacts partially to complete an energizing circuit for the operating coil of relay 16. No other relay control circuits are completed by this condition of energization of relays 25–28.

From the register 24 there are now applied to the flip-flops FF$_1$–FF$_3$ the complement of the address (0 1 1), and there is again applied to the flip-flop FF$_4$ a binary "0" signal. Accordingly, relays 26 and 27 are energized, but relays 25 and 28 remain deenergized. There may now be traced an energizing circuit for the operating coil of relay 16 as from the battery 30 by way of the normally open contacts of relay 26, the normally closed contacts 25d of relay 25, a diode 33, the operating coil of relay 16, normally open contacts of relay 17, switch Sw$_5$, normally closed contacts 28d of relay 28, and by way of normally open contacts of relay 27 to the other side of the battery 30. The relay 16 thereupon closes its contacts 16d to complete an energizing circuit from a battery 34 for the operating coil of relay 14 which thereupon operates to its set or latched position. The relay 16 also opens its normally closed contacts 16c to interrupt the circuit to the operating coil of relay 17. The relay 14 closes its normally open contacts to complete an energizing circuit from a battery 35 to the operating coil 13 of the solenoid actuated valve 10 to move the valve to its open position. It is to be noted that the opening of the normally closed contacts 16c, though deenergizing the coil of relay 17, does not change the position of the set relay 17. However, the relay 16 in closing its normally open contacts 16e completes an energizing circuit from a battery 36 for the tripping coil 18 of relay 17. The relay 17 thereupon is actuated to its illustrated deenergized position to open the circuit of the operating coil of relay 16. This relay operates to its open position, but the relay 14 remains in its set position to keep the valve 10 in its open or actuated position. There it stays until the tripping coil 15 of relay 14 is energized.

It is to be understood that the operating coil of relay 14 and its tripping coil 15 may be utilized directly to actuate a final control element in selected directions, the added solenoid 13 being provided as illustrative of a further example of a typical embodiment of the present invention. Similarly the relays 16 and 19 may be utilized directly to actuate a final control element in selected directions. Thus the relay 16 may actuate a valve to an open position where it will remain until closed in response to energization of the operating coil of relay 19. Valves of this kind, as other final control elements including overcenter type of actuators, are well known to those skilled in the art.

In response to a change of the measured variable, the magnitude of which is under the control of the final control element 10, or whenever there is otherwise applied from the register 24 an address signal for the relay system 22 together with a binary "1" signal for the flip-flop circuit FF$_4$ and thereafter followed by the complement of the address with the same binary output for FF$_4$, the coil 13 is deenergized to return the final control element 10 to its original position.

Instead of an address signal for relay system 22, other address signals, command signals and complements of the addresses may be in succession read into and out of the register for actuation of the relay system 23, or for the additional relay systems above referred to and connected to signal channels S$_1$ and S$_2$.

Assuming now that the signal to be read from the register again includes the address 1 0 0, with the directional signal for the flip-flop FF$_4$ a binary "1," the following occurs. The relay 25 is energized and so is the relay 28. There is then completed a single energizing circuit which includes the operating coil for the set relay 20 and which may be traced from the battery 30 by way of the normally closed contacts of relay 26, contacts 25e, a diode 37, contacts 19c of relay 19, the operating coil of set relay 20, contacts 28e, and through the normally closed contacts of relay 27 to the other side of the battery 30. The relay 20 is latched into its closed position partially to complete an energizing circuit for the operating coil of relay 19. This circuit cannot be completed until there has been applied to the flip-flops FF$_1$–FF$_3$ the complement (0 1 1) of the address signal and the binary "1" for flip-flop FF$_4$. When the foregoing occurs, the relays 26, 27 and 28 are energized, while the relay 25 remains in its deenergized position. The energizing circuit for relay 19 may now be traced from battery 30 by way of the upper contacts of relay 26, contacts 25d, a diode 40, the operating coil of relay 19, the normally open contacts of relay 20, a switch Sw$_6$, the contacts 28c, and by way of the normally open contacts of relay 27 to the other side of the battery. The relay 19 in closing its contacts 19d now operates to energize the tripping coil 15 of relay 14, which relay thereupon operates to its open position to deenergize the coil 13 for return of the final control element, the valve 10, to its initial, closed, position.

Any disparity between address and complement prevents the completion of energizing circuits for the operating coil of relay 14 or its tripping coil 15, and thus provides protection against an incorrect address for either of relay systems 22 or 23 resulting from failure of a bistate device to reverse its state. The system protects against the loss of a signal representing a binary digit in storage and likewise guards against errors which may arise by reason of the computer applying to the register incorrect addresses. Directional or control signals for final control elements which may appear in the absence of an address are ineffective.

From the foregoing, it will be seen that if any one of flip-flop circuits FF$_1$–FF$_3$ fails to change from one state to the other for the purpose of supplying not only the desired address signal but also its complement, the relay system 22 will not respond to produce a change in the position of the solenoid actuated by valve 10 or any of the other final control elements. Similarly, the failure of any of the decoding relays 25, 26 and 27 to respond to the address signal and the complement thereof will not result in any change of position of any of the final control elements.

Though the foregoing provisions provide protective features which will guard against practically all possibilities of malfunctioning, nevertheless in some systems it may be desirable to introduce a still further safety factor, specifically to make the operation of the directional signal from the flip-flop circuit FF$_4$ likewise depend upon the presence of the complement of the desired signal. For the latter operation for valve 10, it is only necessary to operate the switches Sw$_5$ and Sw$_6$ from their illustrated positions to connect the conductor 43 to conductor 44, and to connect the conductor 45 to the conductor 42. With the foregoing changes in the circuit and assuming that it is desired to energize the coil 13 of valve 10, the address signal will be as before (1 0 0) with an added binary "0" as the directional signal. When a complement is taken from the register, then the complement of the address plus the directional signal will be 0 1 1 1.

Since the circuits have already been traced in detail, the result of the foregoing changes will be apparent, and it will be seen that when the complement (binary "1") of the directional signal (binary "0") appears, together with the complement of the address, the coil 13 will be energized. Similar changes can be made for the relay system 23 in order that it too will require the complement of the directional signal for operation. In this connection, however, it is to be noted that selected relay systems can be operated in response to the complement of the directional signal, while others need not include this additional feature.

Where additional relay systems are to be utilized, it will be understood that the illustrated system will suffice inasmuch as that system will be suitable for the number of relay systems corresponding with the total number of different addresses which may be set into the register for the three flip-flop circuits FF$_1$–FF$_3$ and decoded by relay system 25–28. Where still more relay systems are desired, then there will be added additional positions in the register 24 and additional flip-flop circuits and additional relay systems with corresponding increase in the number of relay contacts for the relays 25–28 where required.

It is to be observed that when the actuating relay 19 is energized, it completes a circuit through its contacts 19e not only for the releasing coil 21 of the set relay 20, but also completes an energizing circuit for the releasing or tripping coil 18 of set relay 17. Thus, every actuating relay 16, 16a, 19 and 19a completes energizing circuits for all tripping coils so that the relay system is cleared preparatory to the next operation every time an actuating relay has been energized.

In summary, the relays 25–28 provide a decoding means which in conjunction with the conductors associated with the contacts of relays 25 and 28 apply the address signals to the several relay systems 22 and 23 for selective operation of a particular one of a plurality of the control devices or final control elements 10 and 11. For convenience, it will be desirable to refer to the set relay 14 as the "on" device of the final control element, while the releasing coil 15 will be referred to as the "off" device of the final control element. In some applications, the coils 16 and 19, or the coils 14 and 15 (and 14a and 15a, etc.) will be utilized directly in connection with final control elements instead of the simplified arrangement illustrated in the drawing. It is for this reason and for convenience in claiming that they have been described as indicated above.

While there have been described preferred embodiments of the invention, it will be understood that further modifications may be made within the scope of the appended claims.

What is claimed is:

1. A system for the control of the position of a plurality of two-position devices, comprising means for producing an address signal in digital form which uniquely identifies a selected one of said devices and a command signal which identifies the position to be assumed by said selected device and for subsequently producing the complement of said address signal, decoding means connected to receive said signals and said complement, circuit means connected to said devices for controlling their operation, and step-by-step relay means connected to said decoding means responsive sequentially to the application of said address to said decoding means for partially conditioning said circuit means for operation of said identified device to its desired position and to the subsequent application of said complement for completion of the conditioning of said circuit means for operation of said identified device to said desired position by said command signal.

2. The system of claim 1 in which said means for producing an address signal comprises a plurality of bistable devices and in which said decoding means comprises a plurality of relays, one for each said bistable device and selectively operable under the control of said bistable devices for completing a plurality of circuits, one for each of the two states of each of said bistable devices.

3. The system of claim 2 in which said relay means includes at least one actuating relay and one set relay, said set relay having contacts which when closed partially complete an energizing circuit for said actuating relay.

4. The system of claim 3 in which said selected one of said devices has two actuating coils, one including an energizing circuit operable in response to the operation of said actuating relay, and an additional set relay and actuating relay for controlling the energization of the other of said actuating coils of said selected device.

5. The system of claim 1 in which said means which produces said address signal and complement thereof includes all but one of a plurality of bistable devices, and in which said remaining one of said bistable devices provides an output signal of the same binary character with production of both said address signal and of said complement thereof.

6. The system of claim 3 in which there is provided a common energizing circuit for the releasing means of each of said set relays and means for completing said energizing circuit for said releasing means of said set relays upon energization of any one of said actuating relays.

7. The system of claim 1 in which there are provided a plurality of relay systems respectively connected to said decoding means and each responsive to a different coded output from said bistable devices and to the complements thereof.

8. A system for the control of the position of a plurality of two-position devices, comprising means for producing an address signal in digital form which uniquely identifies a selected one of said devices and a command signal which identifies the position to be assumed by said selected device and for subsequently producing the complement of both of said signals, decoding means connected to receive said signals and said complement, circuit means connected to said devices for controlling their operation, and relay means connected between said decoding means and said circuit means, said relay means being responsive alternately to the application of said address and command signal to said decoding means for partially conditioning said circuit means for operation of said identified device to its desired position and to the application of said complements of said signals for completion of the conditioning of said circuit means for operation of said identified device to said desired position.

9. A system for selecting which one of a plurality of devices is to be made to operate, comprising means for producing an address signal in digital form which identifies said selected device to be operated and for producing a complement signal in digital form which is the complement of said address signal, decoding means connected to receive said signals, circuit means connected to said devices for controlling their operation, and relay means connected between said decoding means and said circuit means, said relay means being responsive alternately to application of said address signal to said decoding means for partially conditioning said circuit means for operation of said identified device and to the application of the complement of said address signal to said decoding means for completion of the conditioning of said circuit means for operation of said identified device.

References Cited in the file of this patent

UNITED STATES PATENTS

| | | |
|---|---|---|
| 2,512,038 | Potts | June 20, 1950 |
| 2,679,034 | Albrighton | May 18, 1954 |